United States Patent
Kuo et al.

(10) Patent No.: US 7,221,354 B2
(45) Date of Patent: May 22, 2007

(54) BACK LIGHT MODULE

(75) Inventors: Chien-Hung Kuo, Taichung Hsien (TW); Chuan-Pei Yu, Yilan Hsien (TW)

(73) Assignee: AU Optronics Corporation, Hsinchu (TW)

( * ) Notice: Subject to any disclaimer, the term of this patent is extended or adjusted under 35 U.S.C. 154(b) by 508 days.

(21) Appl. No.: 10/717,494

(22) Filed: Nov. 21, 2003

(65) Prior Publication Data

US 2004/0145559 A1 Jul. 29, 2004

(30) Foreign Application Priority Data

Nov. 21, 2002 (TW) .............................. 91218757 U

(51) Int. Cl.
*G09G 3/36* (2006.01)

(52) U.S. Cl. ........................... 345/102; 345/87; 349/62
(58) Field of Classification Search ................. 345/38, 345/50, 102; 359/599
See application file for complete search history.

(56) References Cited

U.S. PATENT DOCUMENTS 5,931,555 A * 8/1999 Akahane et al. ............. 362/613
6,039,451 A * 3/2000 Grave ......................... 362/29

* cited by examiner

*Primary Examiner*—Richard Hjerpe
*Assistant Examiner*—Duc Dinh
(74) *Attorney, Agent, or Firm*—Troxell Law Office, PLLC

(57) ABSTRACT

A back light module includes light tubes being disposed on a vertical axial line to form an arrangement of the light tubes aligning with each other vertically and an intermediate light tube being disposed on another vertical axial line and between two neighboring ones of the light tubes.

4 Claims, 4 Drawing Sheets

BACK LIGHT MODULE

BACKGROUND OF THE INVENTION

1. Field of the Invention

The present invention relates to a panel display, and particularly to a back light module in a liquid crystal display.

2. Description of Related Art

The liquid crystal display as an output of information has been a mature technique applied by the manufactures and in order to comply with various applications, the liquid crystal display can be made big size for being used in the field of liquid crystal television or small size for being used in the field of mobile phone or PDA.

It is necessary for the liquid crystal display to prepare a light source and the back light module is provided as the light source part. The back light module is equipped with light tube set as the light source in case of large size back light module. The light tube set has a plurality of light tubes being aligned with each other vertically in a horizontal direction so that an identical distance between each light tube and the reflection plate can be obtained. The purpose of this arrangement is that the optical distribution (the brilliance distribution) is more uniform while the produced light source projects to the panel.

However, heat is generated during the light tubes emitting light and the back light module is closed to prevent dirty points from entering the back light module. Therefore, how to avoid overheat in the display module is worth us to care.

A conventional heat dissipation as disclosed in the Japanese Patent publication No. 2001-297623, entitled BACK LIGHT MODULE, provides convection holes and fan with a dust free net. But, the prior art is costly in setting up expense thereof and is noisy resulting from the fan. Hence, the prior art is not a perfect design.

Further, the Japanese Patent publication NO. 2001-216807, entitled DIRECT DOWN TYPE BACK LIGHT MODULE, discloses the metal casing of the electrodes attached to the light tubes is treated with corrugation to increase the heat dissipation area so as to bring the generated heat away. However, this type of heat dissipation removes part of the heat generated by the electrodes of light tubes.

SUMMARY OF THE INVENTION

The crux of the present invention is to provide a new back light module structure, which includes light tubes being disposed on a vertical axial line to form an arrangement of the light tubes aligning with each other vertically and an intermediate light tube being disposed on another vertical axial line and between two neighboring ones of the light tubes.

An object of the back light module according to the present invention is to provide an enlarged distance between light tubes for convection and the light tubes being alternately disposed with different axial lines to be capable of enhancing heat dissipation.

Another object of the present invention is to provide a back light module in which the number of light tubes can be increased due to double axial lines so as to intensify the light output.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
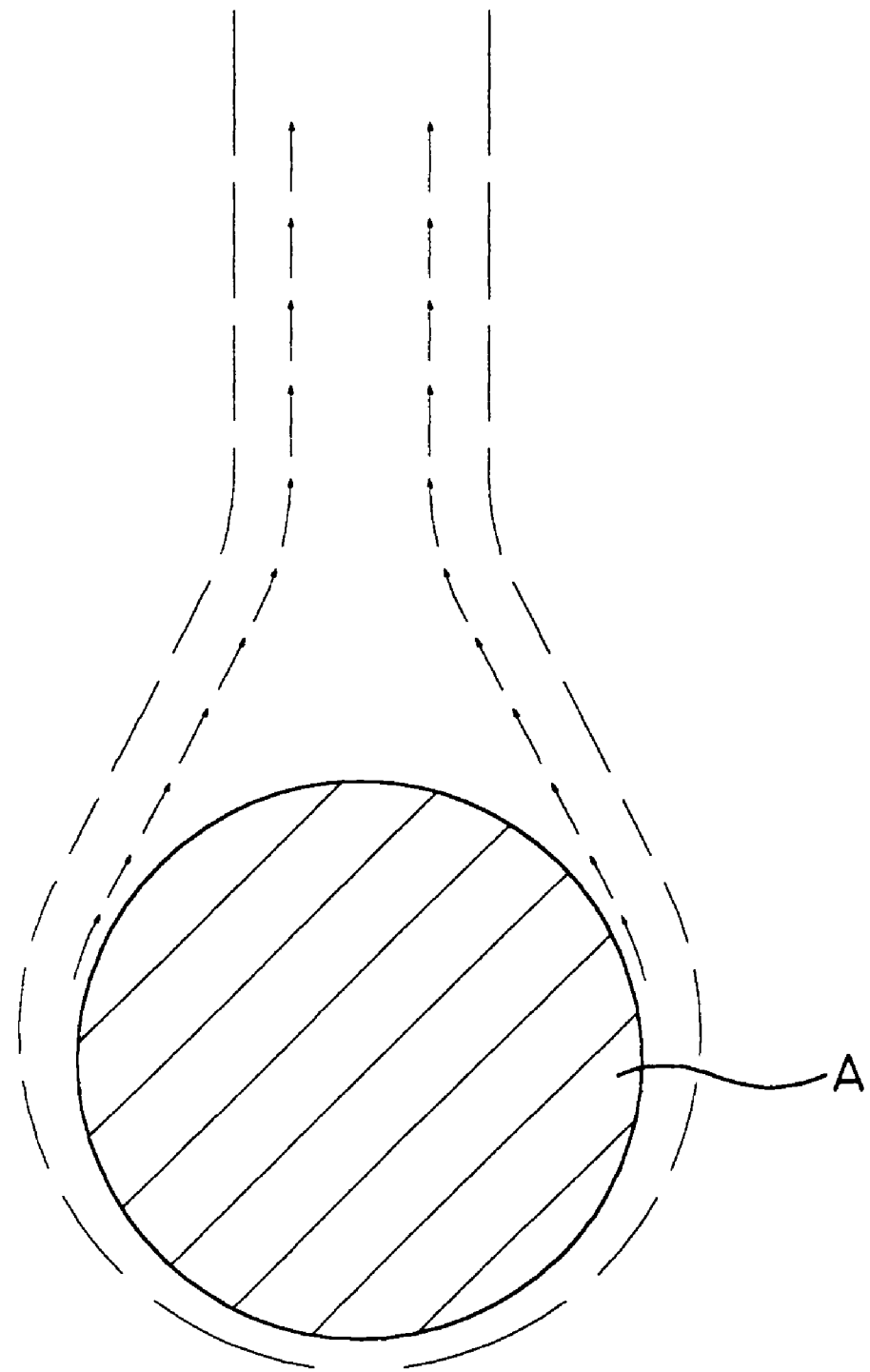
FIG. 1 is a schematic diagram illustrating heat emanation of a single light tube.
Figure 2:
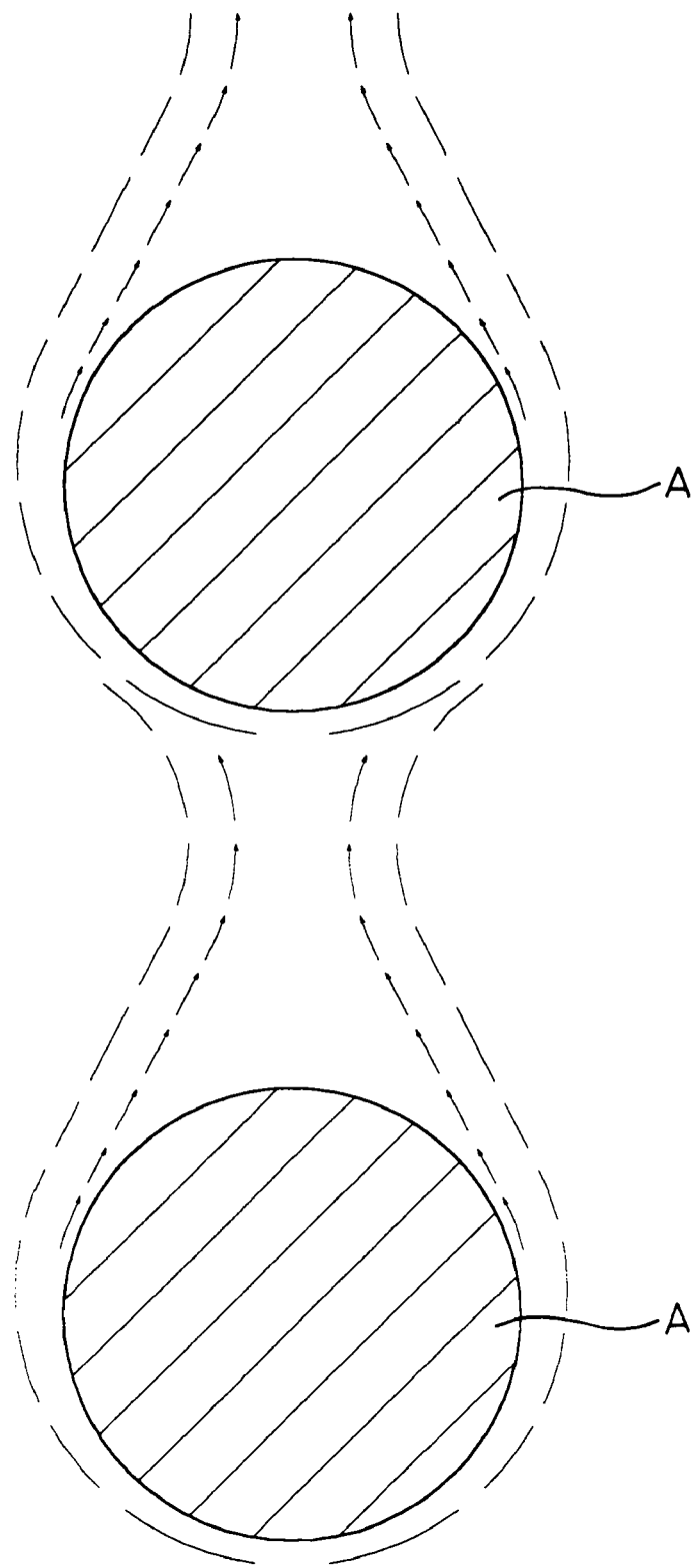
FIG. 2 is a schematic diagram illustrating heat emanation of two coaxial light tubes.

Referring to FIG. 1, basically a light tube A can dissipate heat by way of convection mode and radiation mode and most heat thereof is carried away with the convection mode. Thus, in case of two or more light tubes are coaxially arranged to line up vertically as shown in FIG. 2, the upper light tube receives the heat from the lower light tube due to convection in addition the heat itself so that the upper light tube provides a temperature higher than the lower light tube. Accordingly, the temperatures of the upper and the lower light tubes are inconsistence such that it may result in each light tube emitting a light intensity different from each other and having a life span different from each other.

Figure 3:
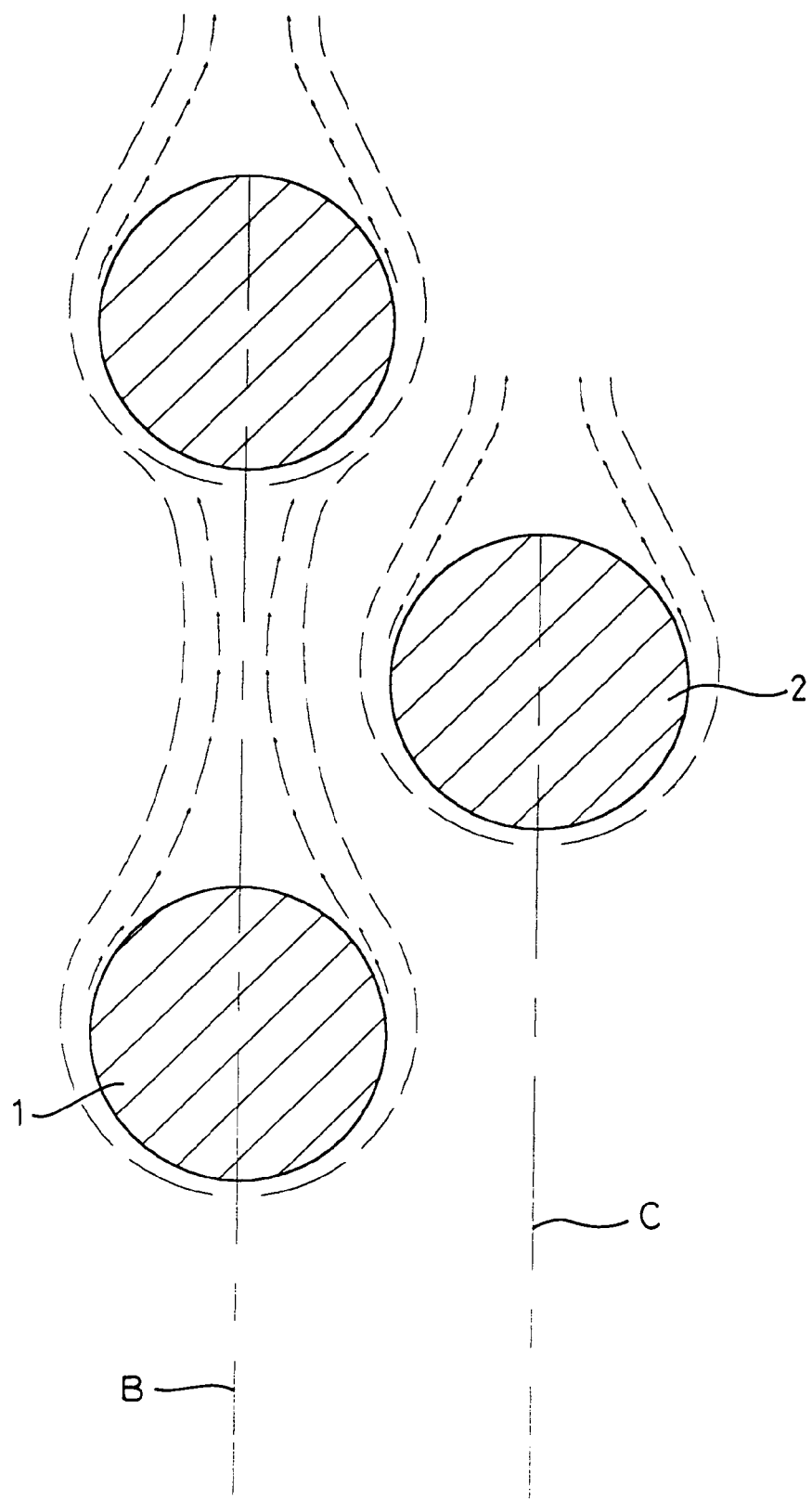
FIG. 3 is a schematic diagram illustrating a light tube of the present invention with heat emanation.

Referring to FIG. 3, a heat dissipation mode of the present invention is two adjacent light tubes are arranged out of alignment alternately, that is, the vertical distance between two adjacent light tubes becomes shorter due to having different axial lines. The light tube 1 with a first vertical axial line B and at least a light tube 2 with a second vertical axial line C so as to have an arrangement of offset alternately.

An enlarged distance between the light tube 1 on the first vertical axial line B and a light tube right above the light tube 1 can be obtained by way of the arrangement so that the right upper light tube is relatively less influenced by the ascending heat of the light tube 1 due to the natural convection. Further, in case of the light tubes 1, 2 having a tube diameter designated as $\psi$ and a horizontal distance between the first vertical axial line B and the second axial line C is not less than $\psi/4$, to provide a heat dissipation channel d between two neighboring light tubes respectively disposed on the first vertical axial line B and second vertical axial line C. An effect of heat dissipation can be obtained after an experimental test. A preferred embodiment of the present invention has revealed that if a vertical distance between two adjacent light tubes 1 on the same axial line is, for example, $10\psi$, the horizontal distance between the first vertical axial line B and the second vertical axial line C can be $3\psi/4$. This is an optimum design under a condition of considering the thickness of a display panel back light module and the heat dissipation effect of the light tubes. Nevertheless, design of the distance can be corrected based on a permissible extent of the actual back light module design so that the preceding statement does not mean a limitation.

Figure 4:
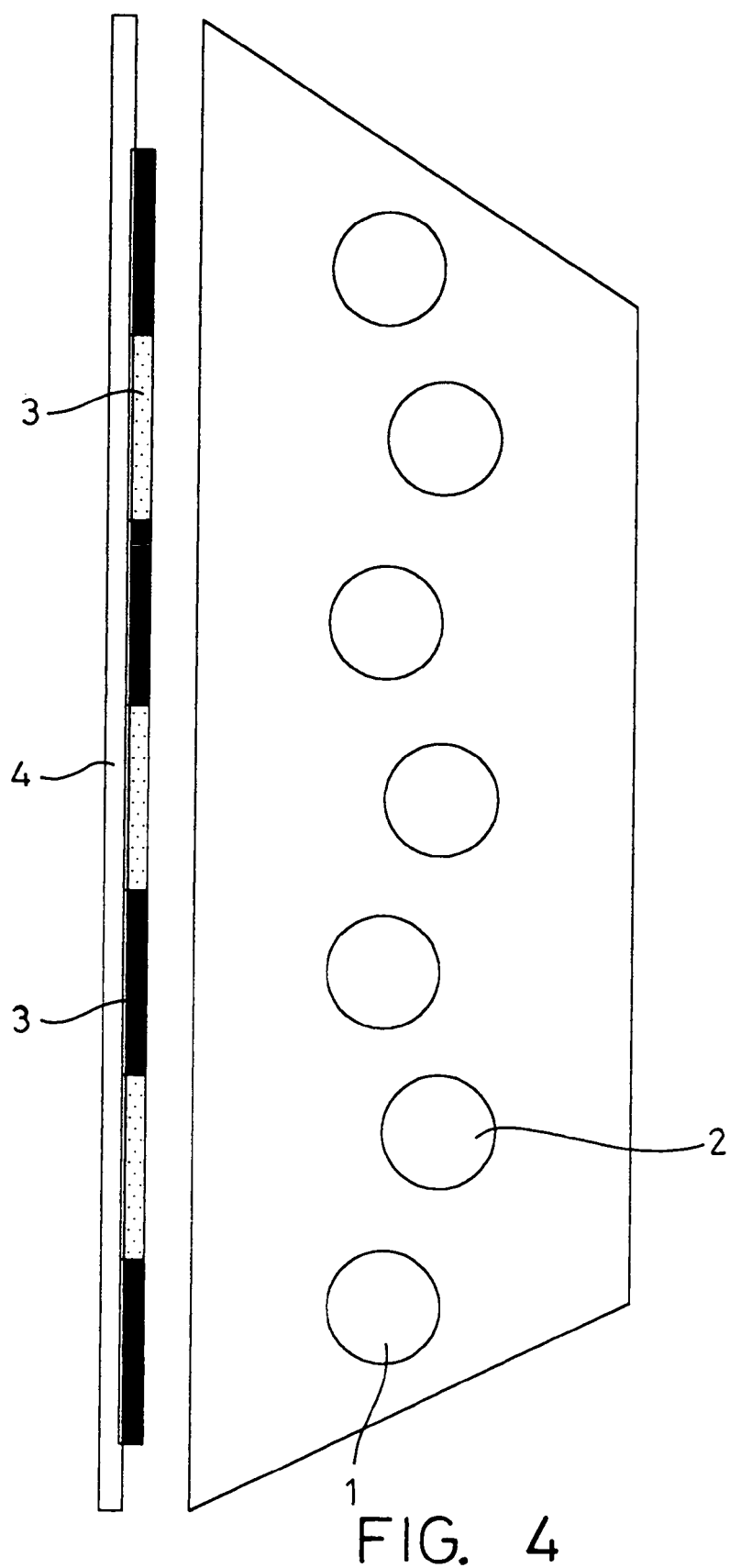
FIG. 4 is a plan view illustrating a diffusion plate with printing according to the present invention.

Referring to FIG. 4, a distance between the light tube 1 and the diffusion plate 3 and a distance between the light tube 2 and the diffusion plate 3 can be varied due to the alternate arrangement. The intensity of illumination is inversely proportional to a square of light projection distance so that in order to obtain a uniform output light to the display panel 4, the diffusion plate 3 can be printed with variable thickness, that is, a position thereof closer to the light tube 1 is printed with thicker dot arrangement and a position thereof farther from the light tube 2 is engaged with thinner or lighter print or without print. Hence, the lightness of the projection light can be regulated.

It is appreciated that the back light module of the present invention provides an enlarged distance between light tubes for convection and the light tubes being alternately disposed with different axial lines to be capable of solving problem with regard to heat dissipation. Further, the number of light tubes can be increased due to double axial lines so as to intensify the light output. These are not possible for the conventional back light module to reach effectively.

While the invention has been described with reference to the a preferred embodiment thereof, it is to be understood that modifications or variations may be easily made without departing from the spirit of this invention, which is defined by the appended claims.

What is claimed is:

1. A back light module, comprising:
   a plurality of light tubes, being disposed on a first vertical axial line to form an arrangement of the light tubes aligning with each other vertically; and
   an intermediate light tube, being disposed on a second vertical axial line and between two neighboring ones of the light tubes, wherein a distance between the first vertical axial line and the second vertical line is greater than one fourth of a light tube diameter to provide a heat dissipation channel between two neighboring light tubes respectively disposed on the first and second vertical axial line.

2. The back light module as defined in claim 1, wherein a distance between two neighboring light tubes on the first vertical axial line is preferably not less than five times of a light tube diameter thereof.

3. A flat display device, comprising
   a display panel;
   a back light module, comprising:
      a plurality of light tubes, being disposed on a first vertical axial line to form an arrangement of the light tubes aligning with each other vertically: and
      an intermediate light tube, being disposed on a second vertical axial line and between two neighboring ones of the light tubes, wherein a distance between the first vertical axial line and the second vertical line is greater than one fourth of a light tube diameter to provide a heat dissipation channel between two neighboring light tubes disposed on the first and second vertical axial line: and
   a diffusion plate, being disposed between the display panel and the light tubes of the back light module;
   wherein, the diffusion plate has a part nearer the light tubes is treated to be hard for light penetration and has a part farther from the light tubes is treated to be easy for light penetration.

4. The flat display device as defined in claim 3, wherein the diffusion plate at a surface thereof is printed net points with the part nearer the light tubes being provided with thick net points and the part farther the light tubes being provided with thin net points.

* * * * *